United States Patent [19]

Martin

[11] Patent Number: 5,137,294

[45] Date of Patent: Aug. 11, 1992

[54] STEP ASSEMBLY FOR VEHICLES

[76] Inventor: Samuel K. Martin, United States Embassy, USAMRU, P.O. Box 30137, Nairobi, Kenya

[21] Appl. No.: 577,023

[22] Filed: Sep. 4, 1990

[51] Int. Cl.⁵ ............................................ B60R 3/02
[52] U.S. Cl. ................................. 280/166; 49/115; 296/151; 296/152
[58] Field of Search ................ 296/146, 151, 152, 61, 296/62; 280/164.1, 166; 49/70, 73, 104, 115

[56] References Cited

U.S. PATENT DOCUMENTS

| | | | |
|---|---|---|---|
| 3,572,753 | 3/1971 | Claassen | 280/166 |
| 3,608,957 | 9/1971 | Maneck | 296/146 |
| 3,751,068 | 8/1973 | Green | 280/166 |
| 4,053,172 | 10/1977 | McClure | 280/163 |
| 4,062,582 | 12/1977 | Youmans | 296/190 |
| 4,200,303 | 4/1980 | Kelly | 280/166 |
| 4,412,686 | 11/1983 | Fagrell | 280/166 |

FOREIGN PATENT DOCUMENTS 385773 9/1973 U.S.S.R. ............................ 280/166

Primary Examiner—Margaret A. Focarino
Assistant Examiner—Andrew C. Pike
Attorney, Agent, or Firm—Griffin Branigan & Butler

[57] ABSTRACT

A folding step apparatus (38) is provided for vehicles having either a hinged door (26) or a sliding door (26'). The apparatus includes two parallel step supporting members (44) pivotally attached to the underside of the vehicle for adjustably supporting a step (42) or plurality of steps. A spring member (46) is used to bias the supporting members (44) and attached steps to a retracted position beneath the vehicle. A cable (64) has a first end attached to the locking end of the door and a second end attached to a front one of the supporting members (44). The cable is at least partially disposed within a hollow cord (70) which extends through portions of the vehicle frame. Opening the vehicle door causes the folding step assembly (38) to pivot about an axis perpendicular to the longitudinal horizontal axis (36) of the vehicle, thereby extending the step assembly (38) for facilitating easy boarding of the vehicle.

16 Claims, 4 Drawing Sheets

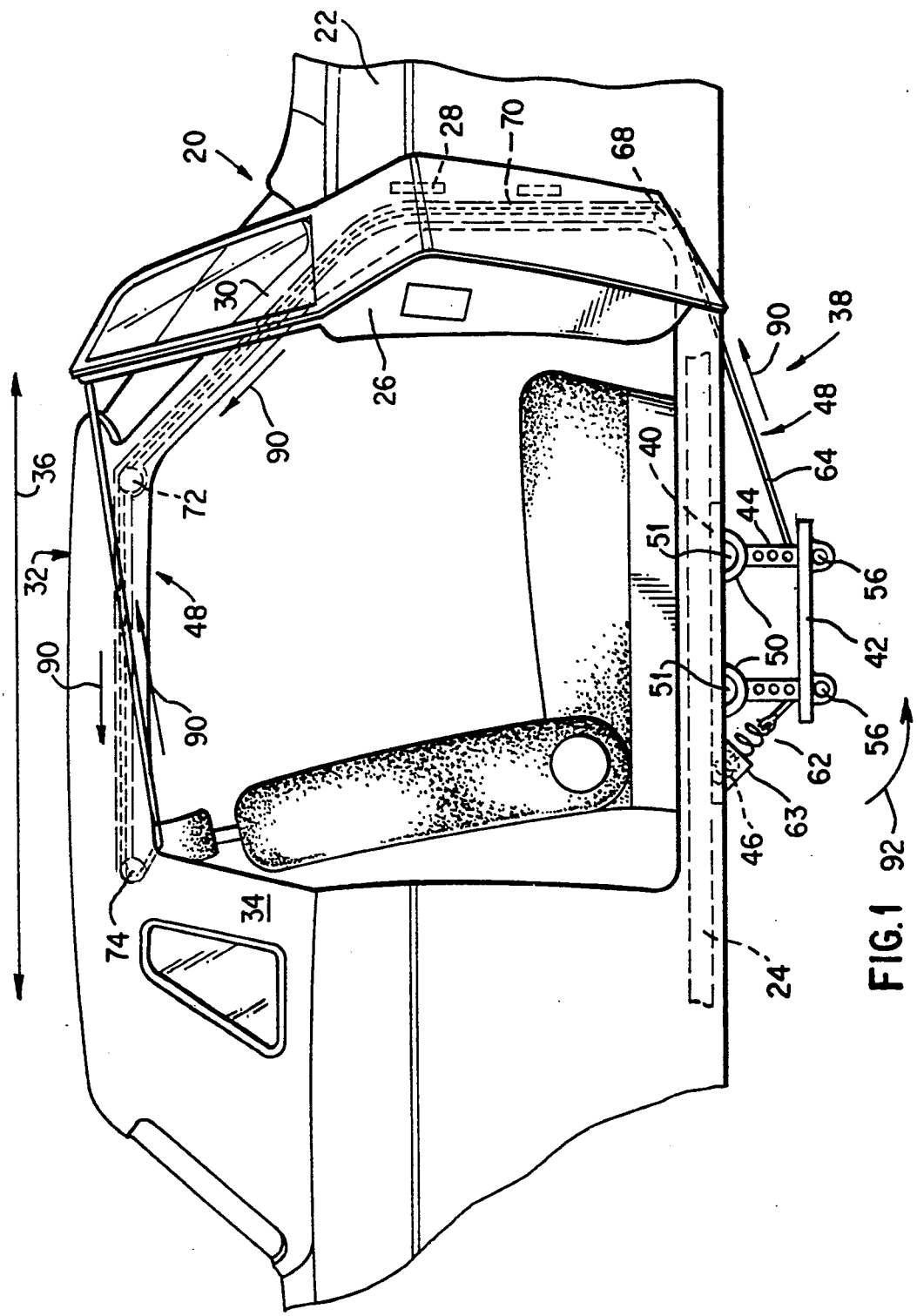

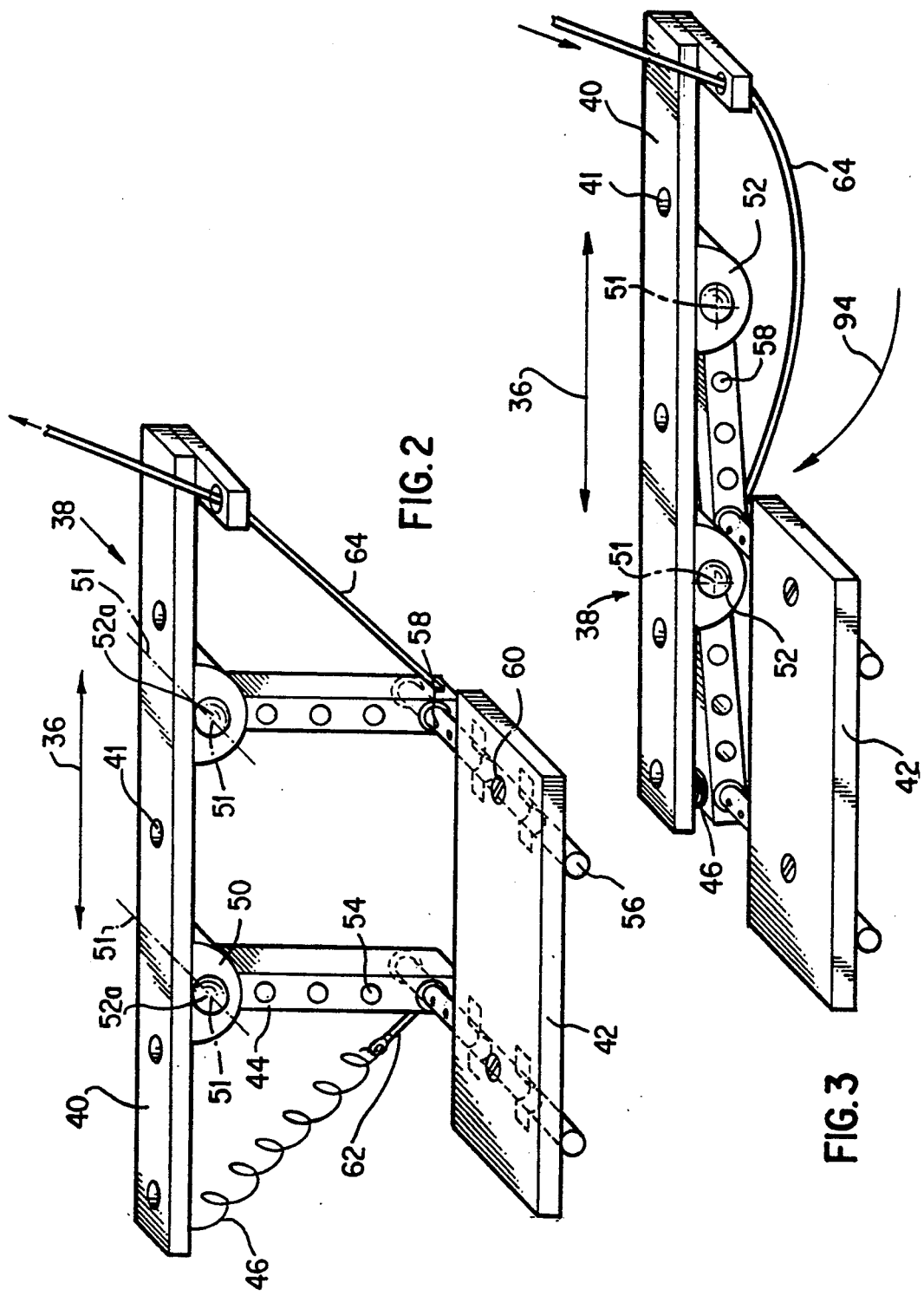

STEP ASSEMBLY FOR VEHICLES

BACKGROUND

1. Field of Invention

This invention pertains to a step apparatus for vehicles and particularly to a step apparatus which is automatically operated upon the opening of a vehicle door.

2. Prior Art and Other Considerations

In recent years recreational vehicles (RVs) and light trucks have been sold in increasing numbers. These vehicles are now being used not just for light hauling and off-road trips, but also for commuting and general transportation purposes.

One of the primary features of these vehicles is their high road clearance. The purpose of the high road clearance is to facilitate off-road driving on rough and uneven terrain. The drawback of having such high road clearance is that embarking and disembarking the vehicle presents difficulty for certain passengers most notably the elderly, the infirm, children, and women wearing tight fitting shirts or gowns.

Previous attempts to overcome this problem fall into two basic categories; permanent steps and retractable steps. The first type of step has limited effectiveness since the closer the step gets to the ground the more the vehicle road clearance is compromised.

The second type of step, the retractable step, also has certain drawbacks. An example of a retractable step is shown in U.S. Pat. No. 3,751,068 to Green, wherein the step extends down and out by a cable attached to the hinged end of a door.

In the above regard, the Green patent does not disclose any way of adjusting the height or the number of steps. Furthermore, since the device patented by Green can only be used with vehicles which have hinged doors, it is not possible to use the device with sliding door vehicles. Finally, by attaching the cable to the hinged end of the door, the Green device has only limited energy available for extending the step since the distance of displacement of the cable is minimal.

U.S. Pat. No. 3,608,957 (Maneck) shows a running board for vehicles with sliding doors. The Maneck device, while satisfactory for use with sliding door vehicles, cannot be readily adapted for use with hinged doors. Maneck also does not disclose any way of adjusting the number and height of the steps.

Accordingly, it is an object of the present invention to provide an improved step for boarding vehicles.

An advantage of the present invention is to provide an improved step for boarding vehicles which can be used with both sliding door vehicles as well as with vehicles which have hinged doors.

A further advantage of the present invention is the provision of an improved step apparatus where the number and height of the step are adjustable.

A further advantage of the present invention is the provision of an improved retractable step assembly which translates energy used or produced in the act of opening and/or closing a vehicle door into energy for operating the retractable step assembly.

SUMMARY

A step apparatus is provided for vehicles having either a hinged door or a sliding door. The apparatus includes two parallel step supporting members pivotally attached to the underside of the vehicle for adjustably supporting a step or plurality of steps. A spring member is used to bias the supporting members and attached steps to a retracted position beneath the vehicle. A cable has a first end attached to the locking end of the door and a second end attached to a front one of the supporting members. The cable is at least partially disposed within a hollow cord which extends through portions of the vehicle frame. Opening the vehicle door causes the step assembly to pivot about an axis perpendicular to the longitudinal horizontal axis of the vehicle, thereby extending the step assembly for facilitating easy boarding of the vehicle.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a side view of a hinged door vehicle having a step assembly of a first embodiment of the invention mounted thereon.

FIG. 2 is an isometric side view of the step assembly of FIG. 1 in an extended position.

FIG. 3 is an isometric side view of the step assembly of FIG. 1 in a retracted position.

DETAILED DESCRIPTION OF THE DRAWINGS

Figure 4:
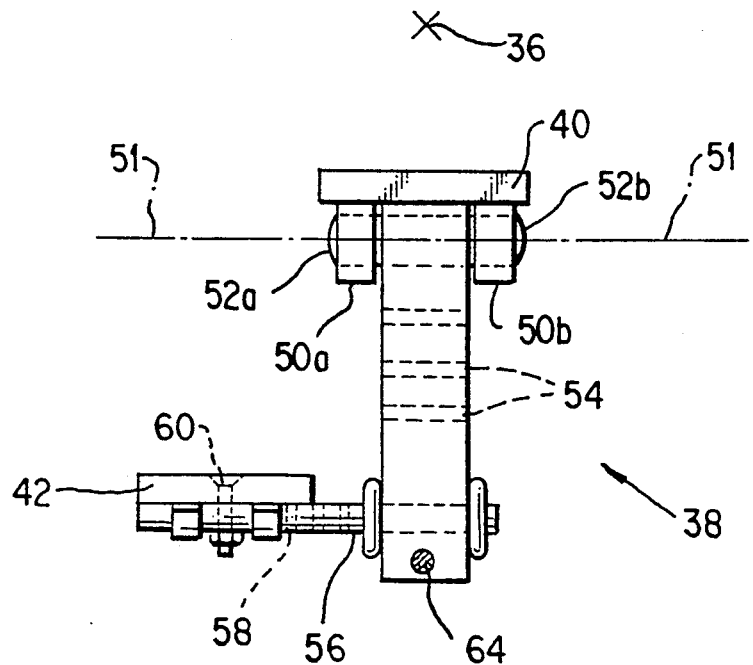
FIG. 4 is a front view of the step assembly of FIG. 2.

FIG. 1 shows a recreational vehicle 20 having a vehicle body 22 and a vehicle undercarriage 24. The vehicle body includes a door 26 hinged to the body 22 by hinges 28. Around the vehicle door 26, the vehicle body 22 further includes a windshield post 30; a top 32; and, a center post 34. The vehicle 20 has longitudinal horizontal axis from its front to its rear, which axis is depicted by the arrow 36.

A step assembly 38 of the embodiment of FIG. 1 includes a mounting bracket 40; a step or platform 42; step supporting members 44 or rails pivotally attached to the mounting bracket 40; step assembly biasing means 46; and, transmission means including cable assembly 48.

The mounting bracket 40 is a rectangular plate which is secured to the vehicle under carriage 24. The mounting bracket 40 can be secured to vehicle undercarriage 24 by any suitable means such as welding, fastening, or clamping. In the illustrated embodiment, apertures 41 are provided for fastening the bracket 40 to the vehicle undercarriage 24.

The underside of mounting bracket 40 has two pairs of depending semi-circular rings 50 formed thereunder. The pairs of rings 50 are displaced from one another along the direction of axis 36 by a distance which is on the order of the length of the step 42. Within each pair of rings 50, an outer ring 50a is positioned closer to the step 42 in the sense of the width of the bracket 40 (e.g., in the sense of a transverse or width axis 51 of the vehicle 20), as seen in FIG. 4.

Two parallel step supporting members 44 are provided. The step supporting members 44 each have proximal ends which bear projections 52. In this regard, the proximal end of each step supporting member has a first projection 52a which extends transversely toward the step 42 and second projection 52b which extends toward a centerline of the vehicle 20. A bearing sleeve or other friction reducing means is provided in each ring 50 to provide smooth pivoting action about axis 51. Accordingly, the step supporting members 44 pivotally depend about the rings 50 on mounting bracket 40.

The proximal ends of the step supporting members 44 are thus spaced apart (i.e., are in spaced relation) along the axis 36. Each step supporting member 44 is pivotal about a horizontal axis 51 which is perpendicular to axis 36. The axis 51 about which each step supporting member pivots extends through the projections 52 provided at the proximal ends of the members 44.

The step supporting members 44 also have a plurality of evenly spaced apertures 54 for securing at least one step 42 to the step supporting members 44. The apertures 54 are provided so that the height of the step 42 relative to the ground is adjustable. In addition, the apertures 54 permit the inclusion of further steps should such be desirable.

The step 42 lies in an essentially horizontal plane. The step 42 has a pair of cylindrical support arms 56 attached to the underside thereof. The support arms are spaced apart relative to the length of the step (e.g., in the sense of arrow 36) at a distance on the order of the separation between centerlines of the supporting members 44. Each support arm 56 has an end adapted for insertion into a selected one of the apertures 54 provided in its corresponding step supporting member 44. In this respect, apertures 54 are provided with bearing sleeves or other friction reducing means so that the support arms 56 can rotate within the apertures 54.

The support arms 56 also have a plurality of apertures 58 extending diametrically therethrough. A selected one of the apertures 58 receives a fastener 60 which extends through the step 42 for securing the step 42 to the support arm 56. The provision of a plurality of apertures 58 facilitates positional adjustment of the step 42 relative to width of the vehicle body (e.g., transverse to the direction of arrow 36). Thus, the user can adjust the step 42 so as to provide a desired clearance from the vehicle.

The step assembly biasing means 46 is securely fastened to the mounting bracket 40. The biasing means 46 includes a tightly coiled spring, a first end of which is anchored to the mounting bracket 40 and a second end of which is connected to a first length of cable 62. The coiled spring is located in a housing 63.

The first length of cable 62 is connected to a distal portion of the rear step supporting member 44. As will be seen below, the biasing means 46 urges the step supporting members 44 to a retracted position (shown in FIG. 3) beneath the vehicle body 22 by causing the step supporting members 44 to pivot about an axis which is perpendicular to the longitudinal axis 36 of the vehicle 20.

Referring again to FIG. 1, the transmission cable assembly 48 includes a second length of cable 64 which has a first end attached to the front step supporting member 44. The cable 64 travels through an aperture in the vehicle body 22 to and around a first pulley 68. The first pulley 68 changes the orientation of the cable 64 so that cable 64 acquires an essentially vertical orientation. After the cable 64 passes over the first pulley 68, it is threaded through a hollow core 70. The hollow cord 70 is secured to or within the vehicle body 22 so as to remain stationary relative to the cable 64.

The cable 64 travels substantially vertically past the vehicle door 26 through the windshield post 30 to a second pulley 72. The second pulley 72 changes the orientation of the cable 64 so that cable 64 now acquires an essentailly horizontal orientation along the top 32 of the vehicle 20. The cable 64 is horizontally disposed along or within the vehicle top 32 until it passes through an aperture 74 in the vehicle top. The second end of the cables 64, which extends through the aperture 74, is attached to the non-hinged edge of the vehicle door 26, i.e., the end of the door which engages the vehicle centerpost 34.

Figure 5:
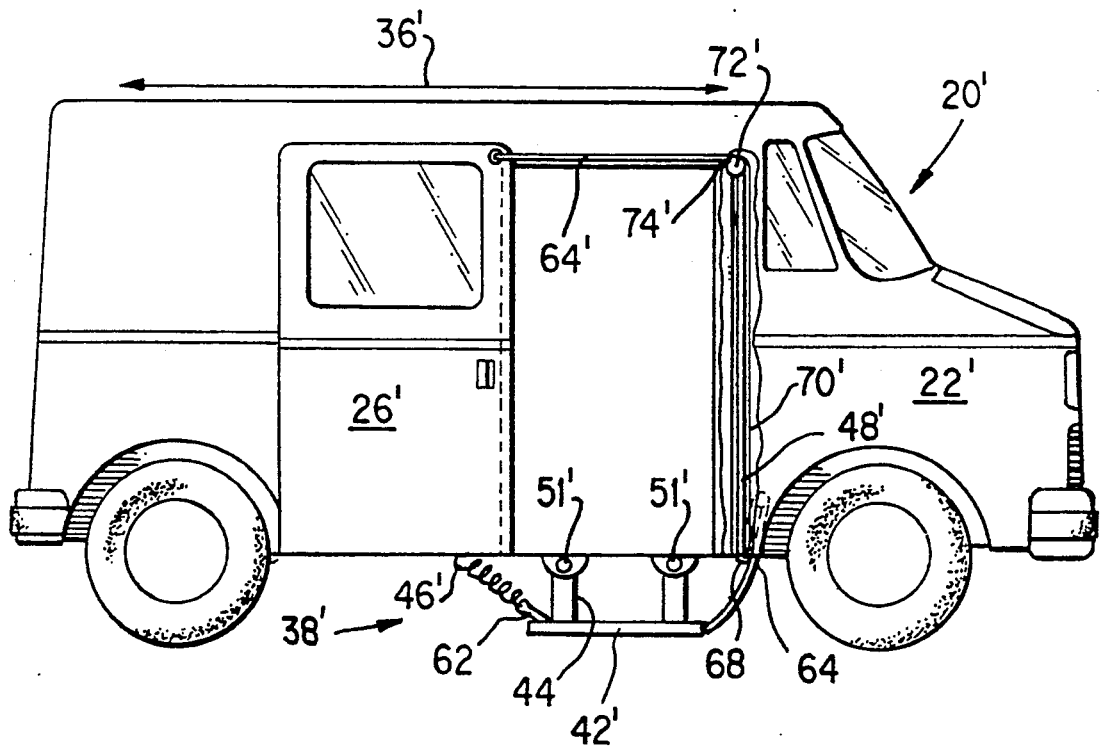
FIG. 5 is a side view of a sliding door vehicle having a step assembly of a second embodiment of the invention mounted thereon.

The step assembly 38' of the embodiment of FIG. 5 differs from the embodiment of FIG. 1 in the manner in which the transmission cable assembly is positioned relative to the vehicle. In this regard, FIG. 5 shows a sliding door vehicle 20' having a sliding door 26'. A cable 64' is attached to the step supporting member 44' which is nearest the front of the vehicle 20'. The cable 64' passes over a first pulley 68'; travels through hollow cord 70'; and passes over a second pulley 72'. The cable passes through aperture 74' and is connected to the vehicle door 26'.

Figure 6:
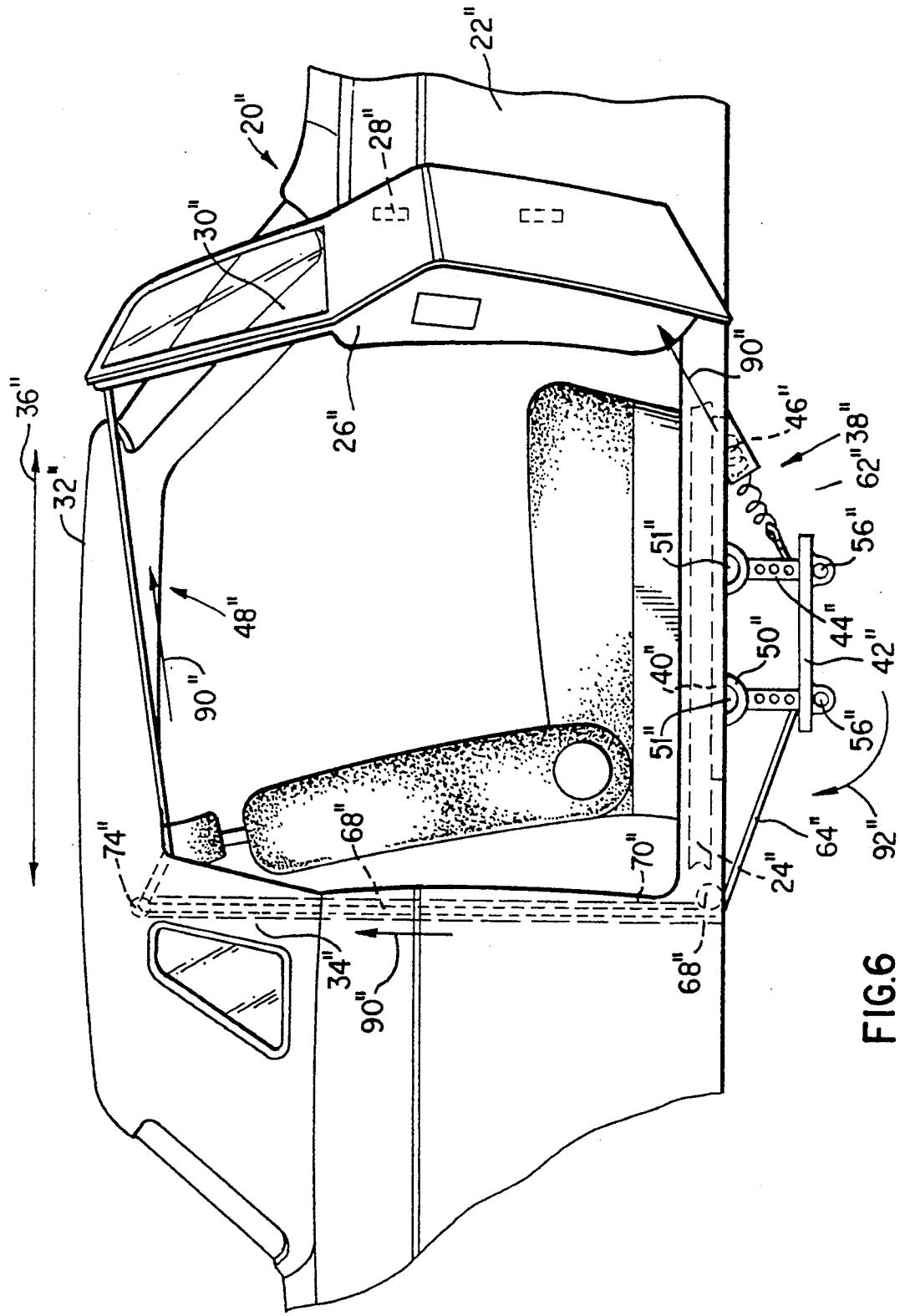
FIG. 6 is a side view of a hinged door vehicle having a step assembly of a third embodiment of the invention mounted thereon.

The step assembly 38" of the embodiment of FIG. 6 also differs from the embodiment of FIG. 1 in the manner in which the transmission cable assembly is positioned relative to the vehicle. In this regard, FIG. 6 also shows a hinged door 26" of a vehicle 20". The step assembly 38" of the embodiment of FIG. 6 has its biasing means 46" positioned beneath a front portion of the mounting bracker 40", rather than beneath a rear portion thereof as occurs in FIG. 1. The first length of cable 62" is connected from the biasing means 46" to the front supporting member 44". The rear supporting member 44" has a first end of the second length of cable 64" connected thereto. The second length of cable 64" extends about pulley 68" up through the center post 34" of the vehicle 20"; about pulley 74"; and, has its second end connected to the top corner of the locking end of the door 26". Portions of the cable 68" extend through a hollow cord 70".

OPERATION

In operation, as the door 26 of vehicle 20 of FIG. 1 is pivoted to its opened position, the cable 64, having its second end connected to the door 26, is pulled in the direction shown by arrows 90. As the cable 64 is pulled in the direction of arrows 90, the force on the cable 64 overcomes the tension of biasing means 46 and causes the step supporting members 44 to pivot in the counter-clockwise sense (shown by arrow 92 in FIG. 1) for extension to an essentailly perpendicularly depending position as shown in FIGS. 2 and 4. In overcoming the tension of biasing means 46, the cable 64 passes over first pulley 68 through the vehicle body 22 via hollow cord 70 along the windshield post 30 to the second pulley 72 through the horizontal section of hollow cord 70 along the top 32 of the vehicle body 22 to aperture 74 and out to the point on the vehicle door 26 where the cable 64 is attached. The first pulley 68 thus acts to translate essentially horizontal motion of the transmission means into essentially vertical motion. The second pulley 72 operates to translate essentially vertical motion into essentially horizontal motion. The distal ends of the step supporting members 44 thereby descend in a vertical direction (e.g. below the vehicle 20) when in the extended vertical position.

When the vehicle door 26 is pivoted to the closed position, the force formerly applied by cable 64 is relaxed, permitting biasing means 46 to exert its biasing force on step supporting members 44, thereby rotating the step supporting members 44 about axis 51 (which is perpendicular to the longitudinal axis of the vehicle 20) in the clockwise sense as shown by arrow 94 in FIG. 3. The plane of the step thus translates vertically between the retracted and extended positions.

The step assembly 38" of the embodiment of FIG. 6 operates in a similar manner as the embodiment of FIG. 1. However, the biasing means 46" exerts a counterclockwise force on the step assembly 38". Upon the opening of the door 26, the cable 64" has forces exerted thereon in the direction of arrows 90" to apply a clockwise rotational force on the step assembly 38".

When the door 26' of the vehicle 20' of the embodiment of FIG. 5 is slid to its opened position, the cable 64' pulls the step supporting member 44' to the extended position against the tension of the biasing means 46'. The cable 64' passes over first pulley 68' through the vehicle body 22' via hollow cord 70' along the windshield post 30' to the second pulley 72' to aperture 74' and out to the point on the vehicle door 26' where the cable 64' is attached. When the vehicle door 26' is slid, moved, pushed, swung to the closed position, biasing means 46' causes step supporting members 44' to rotate about an axis which is perpendicular to the longitudinal horizontal axis 36' of the vehicle 20'.

For doors which open as sliding doors along a track, it is easier to convert the sliding motion to energy for extending the step assembly. Factors enhancing ease of operation include the fact that people generally use two hands when opening a sliding door, and the fact that the entire force applied to displace the door can be utilized instead of a vectorial component thereof. Hence, a sliding door can be easily coupled to translate the door's movement along the horizontal axis to the step assembly's pivoting about an axis which is perpendicular to the horizontal longitudinal axis of the vehicle.

Thus it is seen the present invention provides a retractable step assembly which is connected to the locking end of a door, as opposed to a hinged end of a door, to ensure that the maximum amount of energy available from opening the door will be used to operate the extension. In addition, the step assembly pivots about an axis which is perpendicular to the longtudinal horizontal axis of the vehicle.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property of privilege is claimed are defined as follows:

1. A step apparatus for vehicle having a door frame and an entrance door hinged in said door frame, said door having a hinged end about which said door pivots between an open and a closed position and a locking end, the apparatus comprising:

a mounting bracket for attachment beneath the vehicle;

two step supporting members having proximal ends pivotally attached to said mounting bracket and distal ends, each of said step supporting members having pivotal movement between a retracted positon beneath said vehicle and an extended vertical position subjacent to said vehicle, said pivotal movement of each of said step supporting members occurring about horizontal axes which are perpendicular to a longitudinal horizontal axis of said vehicle, said step supporting members being attached to said mounting bracket at attachment points which are spaced apart along the longtitudinal horizontal axis of said vehicle;

at least one step attached to said step supporting members, the step lying in an essentially horizontal plane;

a spring member attached beneath said vehicle and connected to at least one of said step supporting members for urging said step supporting members to the retracted position beneath said vehicle;

transmission means connectable to said door for causing said step supporting members to acquire the extended position when the door is in the open position; and wherein the plane of the step translates vertically between the retracted and extended positions.

2. The apparatus of claim 1, wherein said step is adjustably attached to said step supporting members.

3. The apparatus of claim 1, wherein said step supporting members comrpise two parallel rails, each of said rails having a plurality of evenly spaced apertures, said step having step support arms which extend through selected ones of said apertures.

4. The apparatus of claim 1, wherein said transmission means has first and second ends, the first end of said transmission means being connected to one of said step supporting members and the second end of said transmission means connected to the locking end of said entrance door.

5. The apparatus of claim 4, wherein said transmission means comprises a cable slidably disposed within a hollow cord.

6. The aparatus of claim 5, wherein said hollow cord is mounted within said door frame, and said transmission means further comprises first and second pulleys, the first pulley acting to translate essentially horizontal motion of the transmission means into essentially vertical motion, the second pulley operating to translate essentially vertical motion into essentially horizontal motion.

7. The apparatus of claim 1, wherein said transimission means comprises a cable slidably disposed within a hollow cord.

8. The apparatus of claim 7, wherein said hollow cord is mounted within said vehicle frame, and said transmission means further comprises first and second pulleys, the first pulley acting to translate essentially horizontal motion of the transmission means into essentially vertical motion, the second pulley operating to essentially translate vertical motion into essentially horizontal motion.

9. A step apparatus for a vehicle having a door frame and an entrance door hinged in said door frame, said door having a hinged end about which said door pivots between an open and a closed position and a locking end, the apparatus comprising:

a mounting bracket for attachment beneath the vehicle;

two step supporting members having proximal ends pivotally attached to said mounting bracket and distal ends, each of said step supporting members having pivotal movement between a retracted position beneath said vehicle and an extended vertical position subjacent said vehicle, said pivoital movement of each of said step supporting members ocuring about horizontal axes which are perpendicular to a longitudinal horizontal axis of said vehicle, said step supporting members being attached to said mounting bracket at attachment points which are spaced apart along the longitudinal horizontal axis of said vehicle;

at least one step attached to said step supporting members, the step lying in an essentially horizontal plane;

means attached beneath said vehicle and connected to said step supporting means for urging said step supporting means to the retracted position beneath said vehicle;

transmission means responsive to the open position of said door for causing said step supporting members to acquire the extended position when the door is in the open position; and wherein the plane of the step translates vertically between the retracted and extended positions.

10. The apparatus of claim 9, wherein said step is adjustably attached to said step supporting members.

11. The apparatus of claim 9, wherein said step supporting members comprise two parallel rails, each of said rails having a plurality of evenly spaced apertures, said step having step support arms which extends through selected ones of said apertures.

12. The apparatus of claim 9, wherein said transmission means has first and second ends, the first end of said transmission means being connected to one of said step supporting members and the second end of said transmission means connected to the locking end of said entrance door.

13. The apparatus of claim 12, wherein said transmission means comprises a cable slidably disposed within a hollow cord.

14. The apparatus of claim 13, wherein said hollow cord is mounted within said door frame, and said transmission means further comprises first and second pulleys, the first pulley acting to translate essentially horizontal motion of the transmission means into essentially vertical motion, the second pulley operating to translate essentially vertical motion into essentially horizontal motion.

15. The apparatus of claim 9, wherein said transmission means comprises a cable slidably disposed within a hollow cord.

16. The apparatus of claim 15, wherein said hollow cord is mounted within said vehicle frame, and said transmission means further comprising first and second pulleys, the first pulley acting to translate essentially horizontal motion of the transmission means into essentially vertical motion, the second pulley operating to essentially translate vertical motion essentially horizontal motion.

* * * * *